United States Patent [19]
Moody

[11] 3,731,024
[45] May 1, 1973

[54] CENTRIFUGAL GOVERNOR
[75] Inventor: Earl A. Moody, St. Peters, Mo.
[73] Assignee: Wagner Electric Corporation, Chicago, Ill.
[22] Filed: June 9, 1972
[21] Appl. No.: 261,274

[52] U.S. Cl. .....................200/80 R, 29/596, 73/538
[51] Int. Cl. .........................H01h 35/10, H02k 15/00
[58] Field of Search ..................200/80; 73/535, 536, 73/537, 538; 318/462; 29/596

[56] References Cited

UNITED STATES PATENTS 2,631,026   3/1953   Regna..............................200/80 R
3,185,788   5/1965   Zollman, Jr........................200/80 R

*Primary Examiner*—David Smith, Jr.
*Attorney*—Joseph E. Papin

[57] ABSTRACT

A governor device for an electric motor having a rotatable shaft is provided with a retainer plate adapted to be connected for concerted rotation with the shaft, and opposed pivot pins are integrally provided on said retainer plate respectively having free ends juxtaposed with the periphery of said shaft to retain a pair of governor weight members against displacement from pivotal engagement with said pivot pins when said shaft is connected with said retainer plate.

20 Claims, 8 Drawing Figures

CENTRIFUGAL GOVERNOR

FIELD OF THE INVENTION

This invention relates generally to electric motors and in particular to a governor device for use therein.

BACKGROUND OF THE INVENTION

In the past, governor devices have been utilized in electric motors to effect the short circuiting of the starting or auxiliary windings thereof when the rotational speed of the motor shaft attained a predetermined value, said governor device being concertedly rotatable with said shaft, and upon the short circuiting of said start windings, the motor was thereafter energized by its run or main windings. An object of the present invention is to provide a governor device for an electric motor which is simple in construction, reliable in operation, and which is simply and economically manufactured and assembled, and this, as well as other objects and advantageous features of the present invention, will become apparent in the specification which follows.

SUMMARY OF THE INVENTION

Briefly, the present invention includes a governor device for an electric motor having a rotatable shaft, means adapted to be connected for concerted rotation with said shaft including a pair of pivot means, a pair of other means pivotally mounted on said pivot means, and end portions on said pivot means juxtaposed with the periphery of said shaft when said first named means is connected therewith to obviate displacement of said other means for said pivot means. The invention also includes the method of assembling and retaining opposed aperture means respectively in the pair of other means in pivotal engagement with the pair of pivot means.

RELATED PATENTS

This patent application is related to U.S. Pat. No. 2,631,026 issued to A. J. Regna on Mar. 10, 1953, and assigned to the common assignee of this patent application which is a patentably distinct improvement.

BRIEF DESCRIPTION OF THE DRAWINGS

In the drawings which illustrate embodiments of the present invention and wherein like numerals refer to like parts wherever they occur.

DETAILED DESCRIPTION OF THE INVENTION

Figure 1:
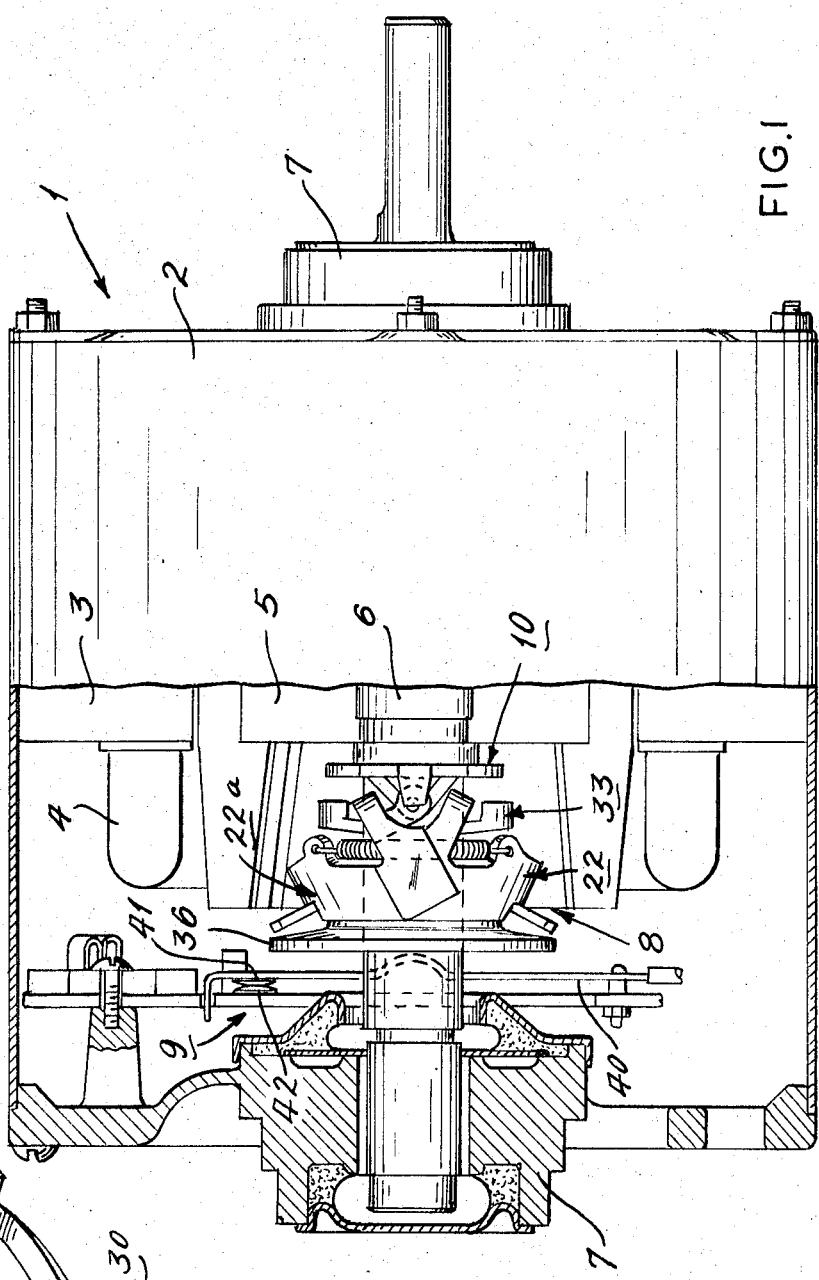
FIG. 1 is a partial sectional view of an electric motor showing the governor device embodied in the present invention therein.

Referring now to the drawings in detail and in particular to FIG. 1, an electric motor 1 is provided with a housing 2 having an annular slotted stator 3 with windings 4 disposed therein, and an armature or rotor 5 is rotatably mounted in said stator being drivingly connected with a shaft 6 which is suitably journaled in bearings 7, as well-known in the art. A governor device, indicated generally at 8, is mounted on the shaft 6 for concerted rotation therewith to actuate a switch 9 which makes and breaks the circuit for the starting windings (not shown) of the motor 1.

Figure 2:
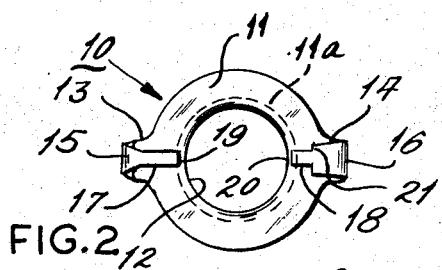
FIG. 2 is a plan view illustrating the support for the governor device of FIG. 1.
Figure 3:
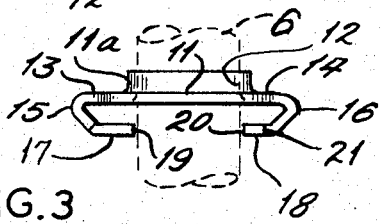
FIG. 3 is an end elevational view of the support of FIG. 2 showing the motor shaft assembled therein in phantom.

The governor device 8 is provided with support means or a retainer 10, as also shown in FIGS. 2 and 3, having a plate or base portion 11 which extends generally radially of the shaft 6, and an annular mounting extension or flange 11a is integrally formed with said base portion substantially normal therewith. A bore 12 is coaxially provided through the support plate and extension 11, 11a, and said bore is predeterminately disposed in press-fit engagement or other well-known connection with the shaft 6 wherein said support plate is concertedly rotatable with said shaft. Opposed leg portions 13, 14 extend generally radially outwardly of the support plate 11, and one of the ends of said leg portions are integrally formed with the periphery of said support plate while the other ends of said leg portions are integrally connected with opposed generally U-shaped portions 15, 16, respectively. Other opposed leg portions which define pivot pins 17, 18 extend generally transversely with the legs 13, 14, and said pivot pins have one of their ends integrally formed with the U-shaped portions 15, 16 while the opposed distal or free end portions 19, 20 of said pivot pins are predeterminately juxtaposed in rather close spaced relation with the periphery of the shaft 6, respectively; and, it should be noted that a shoulder or abutment 21 is provided adjacent to the juncture of the pivot pin 18 with the U-shaped portion 16 wherein the radially extending length of said pivot pin is predeterminately less than that of the pivot pin 17.

Figure 4:
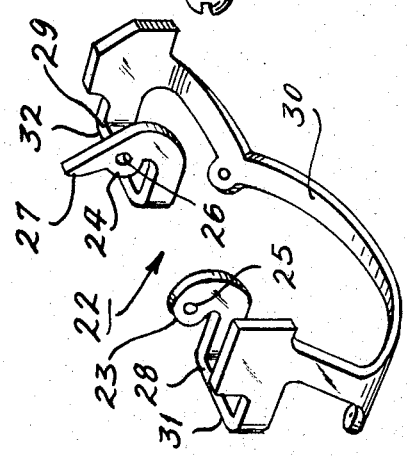
FIG. 4 is an isometric view of the flyweight arms of the governor device of FIG. 1.

The governor device 8 is also provided with a pair of flyweight or arm members 22, 22a of like configuration, and for the sake of brevity only the arm member 22 is shown in FIG. 4. The arm members 22, 22a are provided with opposed side or pivoting portions 23, 24 and 23a, and 24a which are predeterminately spaced from each other and substantially in parallel planes, and axially aligned pivot pin receiving apertures or journaling portions 25, 26 and 25a, 26a are respectively provided in said side portions. The side portions 24, 24a are provided with extensions or abutment members 27, 27a for a butting or positioning engagement with the base portion 10 when the governor device 8 is in its circuit making or normal inoperative position, as discussed hereinafter. Generally U-shaped portions or members 28, 29 and 28a, 29a are integrally interconnected between the side portions 23, 24 and 23a, 24a and generally arcuate shaped weight members 30, 30a, and abutments or surfaces 31, 32 and 31a, 32 a are respectively provided on the base portions of said U-shaped members for engagement with the support or circuit breaking position, as discussed hereinafter.

Figure 6:
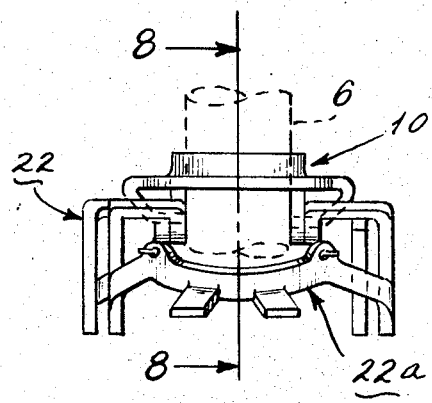
FIG. 6 is an elevational view of the flyweight arms and support shown in FIG. 5 illustrating such in their assembled positions.
Figure 5:
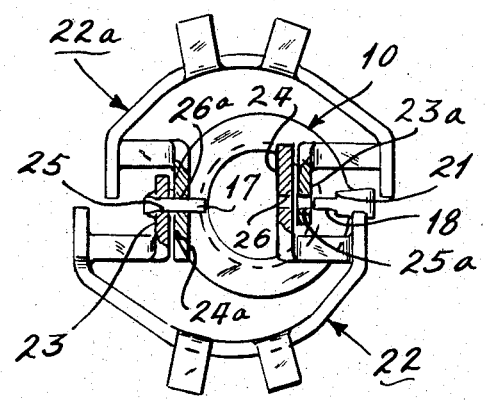
FIG. 5 is a plan view of the support and flyweight arms of the governor device of FIG. 1 illustrating the method of assembling said flyweight arms on said support.

To assemble the arms 22, 22a on the support 10, as shown in FIG. 5, the apertures 25, 25a and 26, 26a are predeterminately sized or dimensioned with respect to the pivot pins 17, 18 to permit the aperture 25 in the side portion 23 of the arm 22 to be received on the pivot pin 17 with said arm slightly cocked or out of alignment by a slight angle with respect to said pivot pins, and the arm 22 is then moved toward a leftwardly displaced position on the pivot pin 17. The movement of the arm 22 toward its leftward displaced position on the pivot pin 17 permits the insertion of the side portion 24 into an aligned position between the pivot pins 17, 18 with the aperture 26 aligned with the pivot pin 18 but displaced therefrom. With the arm 22 in its leftward displaced position, as described above, the aperture 26a of the arm 22a is then positioned on the pivot pin 17 with said arm slightly cocked or out of alignment by a slight angle with respect to the pivot pins 17, 18, and said arm is then moved toward a leftwardly displaced position on the pivot pin 17 to engage the side portion 24a of the arm 22a with the side portion 23 of the arm 22. The movement of the arm 22a toward its leftwardly displaced position on the pivot pin 17 permits the insertion of the side portion 23a into an aligned position between the side portion 24 and the pivot pin 18 with the aperture 25a in alignment with the pivot pin 18 and the aperture 26 of the arm 22. The arms 22, 22 a are then moved rightwardly toward their respective assembled positions in overlapping relation to pivotally engage the apertures 26, 25a thereof with the pivot pin 18 urging the side portion 23a of the arm 22a into abutting or positioning engagement with the pin abutment 21 while the apertures 25, 26a of said arms are maintained in pivotal engagement with the pivot pin 17 adjacent to the free end thereof, as shown in FIG. 6.

Figure 7:
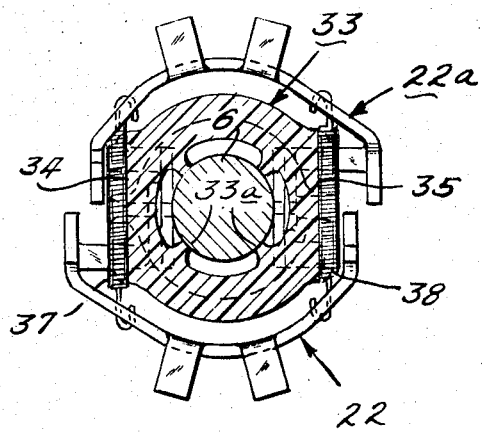
FIG. 7 is a left side elevational view of the governor device of FIG. 1 with the switch operating hub thereof partially cut away to show the positions assumed by the governor springs when the weight members of said governor device are in their open or operative positions.
Figure 8:
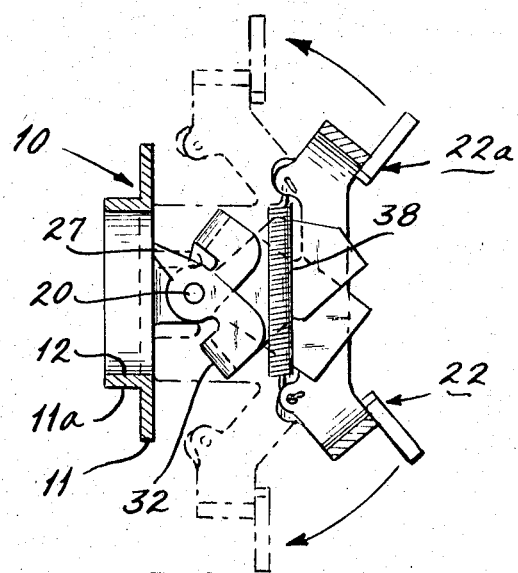
FIG. 8 is a sectional view of the governor device taken along line "8—8" of FIG. 6 showing the weight members of said governor device in their inoperative positions in cross-section and in their operative positions in phantom.

Referring now to FIGS. 1 and 7, an axially movable governor hub or collar member 33 is provided with an axial bore 33a therethrough which is slidably received on the shaft 6 and with opposed spring receiving grooves 34, 35 in the peripheral portion of said hub adjacent to the rightward end thereof, and a radially extending flange or face portion 36 is provided on the leftward end of said hub in engagement with the switch 9. The hub 33 is received within the arms 22, 22a in their assembled position on the support 10, and springs 37, 38 are then positioned in the grooves 34, 35 having their opposed ends or hooks connected with the arms 22, 22a, respectively. In this manner, the springs 37, 38 are interconnected between the arms 22, 22a and the hub 33 in driving engagement with the hub grooves 34, 35 which urges said hub in a leftward direction on the shaft 6 to engage the hub flange 36 with a spring arm 40 of the switch 9 thereby urging a switch contact 41 on said spring arm into circuit making engagement with a cooperating stationary switch contact 41 for energizing the motor start winding circuit (not shown) when the governor device 8 is in its inoperative position, and in the inoperative position of said governor device, the compressive forces of said springs acting on said arms urge the abutments 27, 27a thereof into abutting engagement with the support plate 11, as shown in FIG. 8, which is intended to obviate contact between the arms 22, 22a and the hub 33. It should be noted that the springs 37, 38 are positively contained against radially outward displacement from the hub grooves 34, 35 by the arms 22, 22a, such radially outward displacement or deflection being effected by centrifugal force upon the rotation of the governor device 8 and by magnetic attraction upon the energization of the motor 1. Of course, when the hub 33 and arms 22, 22a are so assembled on the support 10, the shaft 6 is received in the support bore 12 in press-fit engagement, and the juxtaposition of the free ends 19, 20 of the pivot pins 17, 18 with the periphery of said shaft obviates the displacement of the apertures 25, 26 and 25a, 26a of said arms from pivotal engagement with said pivot pins.

OPERATION

With the component parts of the motor 1 and the governor device 8 therefor in their normal or inoperative positions as described hereinbefore, the starting winding circuit (not shown) is completed through the engaged or closed contacts 40, 41 of the switch 9 when said governor device is in its inoperative position and the windings 4 of said motor are energized. Of course, the energization of the motor windings 4 effects rotation of the rotor and shaft 5, 6, as is well-known in the art, and when said rotor and shaft attain a predetermined revolutions per minute or speed of rotation, the centrifugal forces respectively acting on the arms 22, 22a upon the concerted rotation of the governor device 8 with said shaft overcomes the compressive forces of the springs 37, 38 effecting pivotal movement of said arms on the pivot pins 17, 18 radially outwardly toward their operative positions. Of course, this pivotal actuation of the arms 22, 22a from their inoperative position disengages the abutments 27, 27a from the support plate 11 and moves the abutments 32, 32a of said arms into engagement with said support plate which limits the pivotal movement of said arms to define the operative position thereof, as shown in FIG. 8. Of course, upon the pivotal actuation of the arms 22, 22a to their operative position, it is apparent that the springs 37, 38 are not only stressed but are axially moved relative to the shaft 6 in a direction toward the pivot pins 17, 18 and the support 10. Since the springs 17, 18 are received in the hub grooves 34, 35 in driving engagement with the hub 33, the axial movement of said springs in response to the pivotal actuation of the arms 22, 22a concertedly drives said hub axially on the shaft 6 toward a position disengaging the hub flange 36 from the spring arm 40 of the switch 9, and upon the disengagement of said hub flange from said spring arm, said spring arm urges its contact 41 toward an open position disengaged from the stationary contact 42 thereby breaking the start winding circuit of said motor and de-energizing the start windings (not shown). When the motor 1 is de-energized, the compressive forces of the springs 37, 38 overcome the centrifugal force acting on the arms 22, 22a upon the reduction of the rotor speed to the predetermined value and moves said arms from their operative positions toward their inoperative positions re-engaging the abutments 27, 27a with the support plate 11. Of course, the driving engagement between the springs 37, 38 and the hub grooves 34, 35 effects the concerted axial movement of the hub 33 with said springs to re-engage the hub flange 36 with the switch spring arm 40 and move the contact 41 into re-engagement with the contact 40 again making the motor start winding circuit (not shown) for excitation upon subsequent energization of the motor 1.

From the foregoing, it is now apparent that a novel governor device 8 for an electric motor 1 is disclosed and that changes or modifications as to the precise configurations, shapes and details of the construction set forth in the disclosure by way of illustration may be made by those skilled in the art without departing from the spirit of the invention.

The embodiments of the invention in which an exclusive property or privilege is claimed are defined as follows:

1. A governor device for an electric motor having a rotatable shaft comprising means adapted to be connected for concerted rotation with said shaft including a pair of opposed pivot means, a pair of outwardly movable members pivotally mounted on said pivot means, and opposed free ends on said pivot means juxtaposed with the periphery of said shaft when said first named means is connected therewith to obviate displacement of said members from said pivot means.

2. A governor device according to claim 1, wherein said members are respectively movable between two positions, and a pair of abutment means respectively on said members for engagement with said first named means, said abutment means being engaged with said first named means to define one of said two positions when the rotational speed of said shaft is less than a predetermined value.

3. A governor device according to claim 1, wherein said members are respectively movable between two positions, and a pair of abutment means respectively on said members for engagement with said first named means, said members being movable in response to the rotational speed of said shaft in excess of a predetermined value toward one of said two positions to engage said abutment means with said first named means.

4. A governor device according to claim 1, wherein said members are respectively movable between two positions, a first and second pairs of abutment means on said members for engagement with said first named means, said members being movable in response to the rotational speed of said shaft in excess of a predetermined value toward one of said two positions to engage one of said abutment means of said first and second abutment means pairs with said first named means and the other of said abutment means of said first and second abutment means pairs being engaged with said first named means to define the other of said two positions of said members when the rotational speed of said shaft is less than the predetermined value.

5. A governor device according to claim 1, wherein said first named means includes a base portion extending substantially radially of said shaft upon the connection therewith of said first named means, said pivot means being connected with said base portion adjacent to the periphery thereof, and extension means on said base portion substantially normal thereto for connection with said shaft.

6. A governor device according to claim 5, comprising a bore in said first named means extending substantially coaxially through said base portion and extension means for connection with said shaft.

7. A governor device according to claim 1, comprising first and second pairs of aperture means in said members, said pivot means being in bearing engagement with said first and second aperture means pairs, respectively.

8. A governor device according to claim 1, wherein said pivot means include a pair of opposed pivot portions having a generally U-shaped configuration integral with said first named means and defining said opposed free ends, respectively.

9. A governor device according to claim 1, wherein said pivot means include first and second pairs of transversely extending leg means, first and second portions having a generally U-shaped configuration integrally connected with said leg means of said first and second leg means pairs, respectively, one of said leg means of said first and second leg means pairs being integral with said first named means and the other of said leg means of said first and second leg means pairs defining opposed pivot pins on which said members are pivotally mounted, and said opposed free ends being on said pivot pins, respectively.

10. A governor device according to claim 9, comprising first and second pairs of aperture means in said members and received in bearing engagement on said pivot pins, respectively.

11. A governor device according to claim 10, comprising first and second pairs of side portions on said members, said first and second aperture means pairs being in said first and second side portion pairs, one of said side portions of said first and second side portion pairs being adjacent to said shaft to obviate displacement of one of the aperture means of said first and second aperture means pairs from said pivot pins and the other of said side portions of said first and second side portion pairs being adjacent to said one side portion of said first and second side portion pairs to obviate the displacement of the other of the aperture means of said first and second aperture means pairs from said pivot pins when said first named means is connected with said shaft, respectively.

12. A governor device according to claim 8, comprising first and second pairs of aperture means in said members in axial alignment, said first and second aperture means pairs being received in pivotal engagement on said opposed pivot portions, respectively.

13. A governor device according to claim 8, comprising a pair of opposed side portions on said members, first and second pairs of aperture means in said side portions and received in pivotal engagement on said opposed pivot portions, respectively.

14. A governor device according to claim 13, wherein said members are pivotally received on said pivot portions in overlapping relation, one of said side portions of said members being adjacent to said shaft to obviate the displacement of one of the aperture means of said first and second aperture means pairs from said pivot portions and the other of said side portions of said members being adjacent to said one side portion of one of said members to obviate the displacement of the other of the aperture means of said first and second aperture means pairs from said pivot portions when said first named means is connected with said shaft.

15. A governor device according to claim 1, comprising a pair of opposed side portions on said members and pivotally received on said pivot means, respectively, one of said side portions of said members being adjacent to said shaft for displacement preventing engagement therewith and the other of said side portions of said members being adjacent to said one said portion of one of said members for displacement preventing engagement therewith when said first named means is connected with said shaft.

16. A governor device according to claim 1, comprising at least one spring means engaged between said members and opposing outward movement thereof.

17. A governor device according to claim 16, comprising an axially movable switch operating member connected with said spring member whereby pivotal outward movement of said members effects axial movement of said switch operating member solely in response to said spring means.

18. A governor device according to claim 1, comprising a switch actuating means adapted for axial movement on said shaft, a pair of opposed groove means in said switch actuating means, a pair of spring means connected between said members and opposing outward movement thereof including intermediate portions received in said groove means in driving engagement with said switch actuating means, said spring means being tensioned and axially movable toward said pivot means upon the outward movement of said members to axially drive said switch actuating member in response to rotational speed of said shaft in excess of a predetermined value.

19. A governor device for an electric motor having a rotatable shaft, means adapted to be connected with said shaft including a base portion extending substantially radially of said shaft, extension means integral with said base portion and extending substantially normal thereto, a bore extending substantially coaxially through said base portion and extension means for press fitted connection with said shaft, first and second pairs of opposed and transversely extending legs, first and second generally U-shaped portions integrally interconnected between the legs of said first and second leg pairs, respectively, one of the legs of said first and second leg pairs being integral with said base portion and the other of the legs of said first and second leg pairs respectively defining opposed pivot pins, and a pair of opposed free ends on said pivot pins in juxtaposition with the periphery of said shaft upon the connection therewith of said first named means, a pair of governor arms pivotally mounted in overlapping relation on said first named means and movable between two positions including first and second pairs of opposed side members, first and second weight members respectively interconnected between said first and second pairs of side members, first and second pairs of aligned aperture means in said first and second pairs of opposed side members pivotally received in bearing engagement on said opposed pivot pins, respectively, one of said side members of said first and second side member pairs being adjacent to said shaft to obviate displacement of one of the aperture means of said first and second aperture means pairs from said opposed pivot pins and the other of said side members of said first and second side member pairs being adjacent to said one side member of said first and second side member pairs to obviate the displacement of the other of the aperture means of said first and second aperture means pairs from said opposed pivot pin when said first named means is connected with said shaft, switch actuating means including a collar portion adapted to be movable on said shaft between circuit making and breaking positions, a bore extending coaxially through said collar portion in axial sliding engagement with said shaft, and a pair of opposed groove means in said collar portion, a pair of spring means having opposed end portions connected with said governor arms and intermediate portions received in said groove means in driving engagement with said collar portion, respectively, the compressive forces of said spring means urging said governor arms toward one of their two positions and driving said collar toward its circuit making position when the rotational speed of said shaft is less than a predetermined value, first and second pairs of abutment means on said governor arms for engagement with said base portion, one of said abutment means of said first and second abutment means pairs being urged toward engagement with said base portion in response to the compressive forces of said spring means to define the one of said two positions of said governor arms and said governor arms also being movable toward the other of their two positions against the compressive forces of said spring means in response to the rotational speed of said shaft in excess of the predetermined value to engage the other of said abutment means of said first and second abutment means pairs with said base portion, and said spring means being drivingly engaged with said collar to effect its axial movement toward its circuit breaking position upon the movement of said governor arms toward the other of their two positions.

20. A method of assembling a pair of opposed apertures of a pair of governor weight members on opposed pivot pins of a retainer for connection with a rotatable shaft of an electric motor comprising the steps of: (1) placing one of the apertures of each of said members in pivotal engagement with one of said pivot pins; (2) placing the other of said apertures of each of said members in alignment with the other of said pivot pins and moving said other apertures into pivotal engagement with said other pivot pin while maintaining said one apertures in pivotal engagement with said one pivot pin; and (3) connecting said retainer to said shaft with the periphery thereof in juxtaposition with said pivot pins for displacement preventing engagement with said members.

* * * * *

UNITED STATES PATENT OFFICE
CERTIFICATE OF CORRECTION

Patent No. 3,731,024  Dated May 1, 1973

Inventor(s) Earl A. Moody

It is certified that error appears in the above-identified patent and that said Letters Patent are hereby corrected as shown below:

On the cover sheet [73] "Wagner Electric Corporation, Chicago, Ill." should read -- Wagner Electric Corporation --.
Column 1, line 33, "for" should read -- from --.

Signed and sealed this 8th day of January 1974.

(SEAL)
Attest:

EDWARD M. FLETCHER, JR.　　　　　RENE D. TEGTMEYER
Attesting Officer　　　　　　　　Acting Commissioner of Patents